United States Patent
Waters

(10) Patent No.: US 6,535,867 B1
(45) Date of Patent: Mar. 18, 2003

(54) SYSTEM AND METHOD FOR ACCESSING EXTERNAL MEMORY USING HASH FUNCTIONS IN A RESOURCE LIMITED DEVICE

(76) Inventor: Christopher J. F. Waters, 22 Half Moon Rise, Bucklands Beach Auckland (NZ)

( * ) Notice: Subject to any disclaimer, the term of this patent is extended or adjusted under 35 U.S.C. 154(b) by 0 days.

(21) Appl. No.: 09/431,016

(22) Filed: Nov. 1, 1999

Related U.S. Application Data

(60) Provisional application No. 60/158,813, filed on Sep. 29, 1999.

(51) Int. Cl.$^7$ .............................................. G06F 17/30
(52) U.S. Cl. ................. 707/1; 707/2; 707/10; 707/101; 709/226; 709/228; 711/216
(58) Field of Search .................. 707/10, 1, 2, 101; 709/226, 228; 711/216

(56) References Cited

U.S. PATENT DOCUMENTS

| | | | | |
|---|---|---|---|---|
| 4,464,713 A | * | 8/1984 | Benhase et al. | 711/205 |
| 4,586,157 A | * | 4/1986 | Rector et al. | 707/540 |
| 5,339,398 A | * | 8/1994 | Shah et al. | 711/216 |
| 5,386,539 A | * | 1/1995 | Nishi | 235/492 |
| 5,446,854 A | * | 8/1995 | Khalidi et al. | 711/1 |
| 5,579,501 A | * | 11/1996 | Lipton et al. | 711/216 |
| 5,713,001 A | * | 1/1998 | Eberhard et al. | 711/216 |
| 5,724,512 A | * | 3/1998 | Winterbottom | 709/226 |
| 5,812,776 A | * | 9/1998 | Gifford | 709/217 |
| 6,038,231 A | | 3/2000 | Dolby et al. | |
| 6,119,131 A | * | 9/2000 | Cabrera et al. | 707/203 |
| 6,119,153 A | * | 9/2000 | Dujari et al. | 707/10 |
| 6,134,632 A | * | 10/2000 | Looi et al. | 707/101 |
| 6,141,690 A | | 10/2000 | Weiman | |
| 6,216,214 B1 | * | 4/2001 | Bryg et al. | 711/207 |
| 6,353,820 B1 | * | 3/2002 | Edwards et al. | 707/10 |
| 6,377,991 B1 | * | 4/2002 | Smith et al. | 709/226 |

OTHER PUBLICATIONS

Knuth, The Art of Computer Programming, vol. 3, 1973, pp. 506543.*

* cited by examiner

Primary Examiner—Greta Robinson
Assistant Examiner—Debbie M. Le
(74) Attorney, Agent, or Firm—Fenwick & West LLP

(57) ABSTRACT

A system and method that computes a hash function based upon the file name, e.g. a URI, that is to be identified in a look-up table stored in external memory. The hash value is multiplied by a first multiplier. The result is used as a pointer to a lookup table that is stored in external memory. The present invention avoids the need to perform string comparisons or to store any file names or addresses on the server.

18 Claims, 6 Drawing Sheets

SYSTEM AND METHOD FOR ACCESSING EXTERNAL MEMORY USING HASH FUNCTIONS IN A RESOURCE LIMITED DEVICE

RELATED APPLICATIONS

This application claims priority from U.S. provisional application No. 60/156,813 filed on Sep. 29, 1999, entitled "A Reconfigurable Web-Server and Modem in a Microcontroller" which is incorporated by reference herein in its entirety, and is related to U.S application Ser. No. 09/431,388, filed on Nov. 01, 1999, entitled "System and Method for Byte-at-a-Time Processing for Communication Protocols", which is incorporated by reference herein in its entirety.

BACKGROUND OF THE INVENTION

1. Field of the Invention

The invention relates generally to the field of computers and more particularly to external file access procedures in resource limited computer systems.

2. Description of Background Art

The ubiquity of the Internet is driving the inclusion of Transmission Control Protocol/Internet Protocol (TCP/IP) stacks in smaller and cheaper devices. Meeting the price and space demands of embedded applications forces designers to look for an alternative to the 32-bit processors historically required for TCP/IP.

As more products are designed with networking capabilities there is a need for networking functionality to be available at a lower price point. The TCP/IP protocol was designed to operate on 32-bit workstations. Consequently, the protocol makes few concessions to resource limited devices like embedded 8-bit microcontrollers.

One of the difficulties of using a resource limited microcontroller to implement a TCP/IP stack is that when data frames are sent, a data validity check value, e.g., checksum or cyclic redundancy check (CRC), is necessary to ensure that the frame is not corrupted during transmission. Conventional TCP/IP stack implementations buffer the entire frame such that a data check function can be performed on the frame. However, these conventional systems require that memory be used to buffer the frame. This is not a feasible option in devices where the amount of on-chip random access memory (RAM) is already small and any use of the RAM could significantly affect the performance of the device.

Another alternative is to limit the size of the data packets in order to minimize the amount of data that needs to be buffered. However, limiting the size of the data packets would decrease the efficiency of the system. Using smaller packets requires that more packets are sent in order to communicate the same amount of data. Since a portion of each packet is usually set aside for addressing and protocol information, smaller packets result in a lower proportion of the bytes being sent being data bytes and thus a lower efficiency. If the link is used less efficiently, then a faster, more complex, and more expensive, physical interface might be required to send the data in the same amount of time A third possibility is that the no redundancy check is performed and the data is sent without being buffered. However, such a reduction in reliability is unacceptable for many potential uses of resource limited devices.

What is needed is a TCP/IP communications protocol system and method that is compatible with legacy systems and that uses a resource limited computer, e.g., an 8-bit microprocessor or microcontroller, that (1) reduces or eliminates the need for buffering (2) does not require addition additional memory, (3) does not require limiting the size of data packets; and (4) is reliable.

Another use of resource limited devices (processors) is to locate files stored in external memory, e.g., electrically erasable and programmable read only memory (EEPROM). For example, in order to access a web page on a web server, the device needs to identify the uniform resource identifier (URI). This URI typically corresponds to a file path in a file system. For example, the file "logo.gif" in the sub-directory "images" could have the URI: "/images/logo.gif". In conventional file systems, a table of file names is stored along with pointers that identify the memory address at which the file data begins. Finding a particular file is achieved by searching through the table of file names, e.g., URIs, until a match is found. There are a variety of ways for optimizing this search, such as structuring the search as a tree. The use of hashing functions is possible, but in conventional systems the file name, e.g., the URI, still needs to be stored in the device when using hashing functions.

In resource limited devices, storing the file names, e.g., URIs, of the relevant files is an inefficient and impractical use of the limited memory resources on the device.

What is needed is a data storage and lookup procedure for use on resource limited computers, e.g., 8-bit microcontrollers, that will enable files stored in external memory to be identified without requiring that the file names or paths, e.g., URIs, be stored on the internal computer memory.

SUMMARY OF THE INVENTION

The invention is a system and method that computes a hash function based upon the file name, e.g. a URI, that is to be identified in a look-up table stored in external memory. The hash value is multiplied by a first multiplier. The result is used as a pointer to a lookup table that is stored in external memory. The present invention avoids the need to perform string comparisons or to store any file names or addresses on the server.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

The present invention solves many of the challenges in squeezing a TCP/IP stack and a web server into a resource limited computer, e.g., a single, high-performance, low-cost, 8-bit microcontroller such as the 50MHz SX Microcontroller that is commercially available from Scenix Semiconductor, Inc., Santa Clara, Calif. In the preferred embodiment the stack is modular and, in different configurations, can fit into any device in the SX family. The code size of the web-server and modem is dictated by the choice of the SX48/52BD devices. These are 8-bit, modified Harvard architecture microcontrollers in a 48 or 52 pin package. They have 4k words of program memory and a 262 byte SRAM register file. The SX48/52BD can be clocked from 0 to 50 MHz and has single cycle instruction execution and deterministic interrupt response making it suitable for software implementations of hardware functions.

An issue encountered during the implementation of one embodiment of the present invention was allowing the stack to process packets larger than the total RAM size of the microcontroller. This was achieved by using the byte-at-a-time processing technique of the present invention coupled with state-machines for decoding packet structure. The protocol stack and modem are implemented in software and can be easily modified and even upgraded in the field using the in-circuit programming capability of the Scenix microcontroller. The byte-at-a-time processing technique provides significant benefits even when the packet size does not exceed the allocated RAM of the microcontroller.

Figure 1:
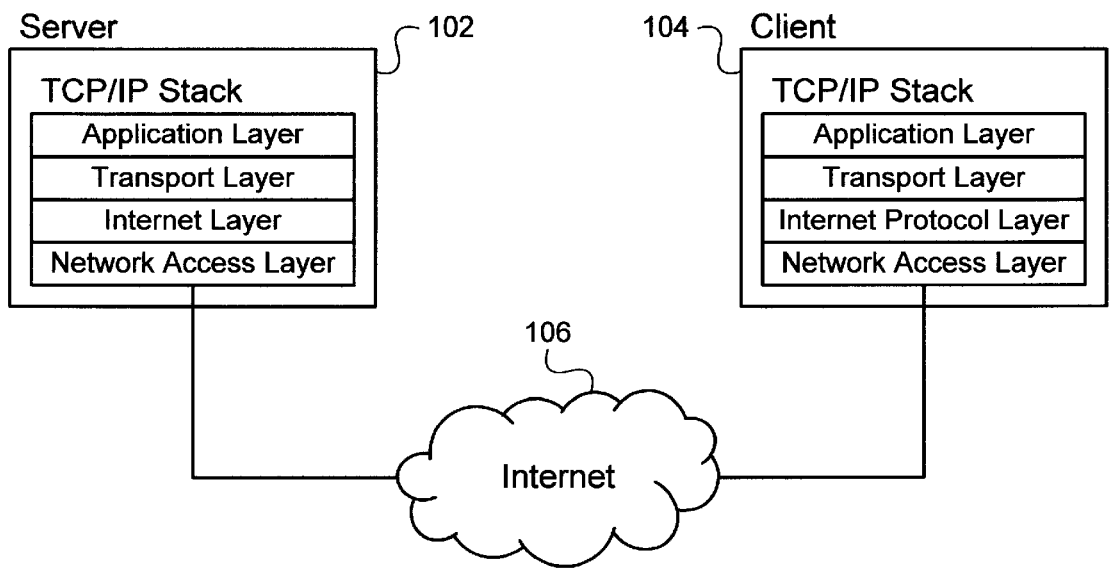
FIG. 1 is an illustration of an environment in which the preferred embodiment of the present invention operates.

FIG. 1 is an illustration of an environment in which the preferred embodiment of the present invention operates. The environment includes a server 102 and a client 104 that are connected via a network, e.g., the Internet. The server 102 and/or the client 104 may be a SX series microcontroller that is commercially available from Scenix Semiconductor, Inc., Santa Clara, Calif. When information is requested by the client 104, an information request command is transmitted to the Server 102 via the network 106. The operation of the network is well known to persons skilled in the art. Both the client 104 and the server 102 have a TCP/IP stack having, for example, a network access layer, an Internet layer, a transport layer and an application layer. Additional layers can be included without departing from the scope of the present invention. A more detailed illustration of the layers is set forth in FIG. 2.

In the preferred embodiment, the standard Point-to-Point Protocol (PPP) is used to manage the serial link between the resource limited device and any serial receiving device, e.g., a modem. This enables the stack to connect to any other machine running PPP such as an Internet Service Provider (ISP). The stack has both User Datagram Protocol (UDP) and Transmission Control Protocol (TCP) transport mechanisms for use in different applications. The Hypertext Transfer Protocol (HTTP) is used at the application layer to provide a web-server. In the preferred embodiment, the web-server resources, e.g., HTML, images or applets, are stored in a file system in an external EEPROM. Only the EEPROM size and the bandwidth of the physical link limit the size of these resources.

Figure 2:
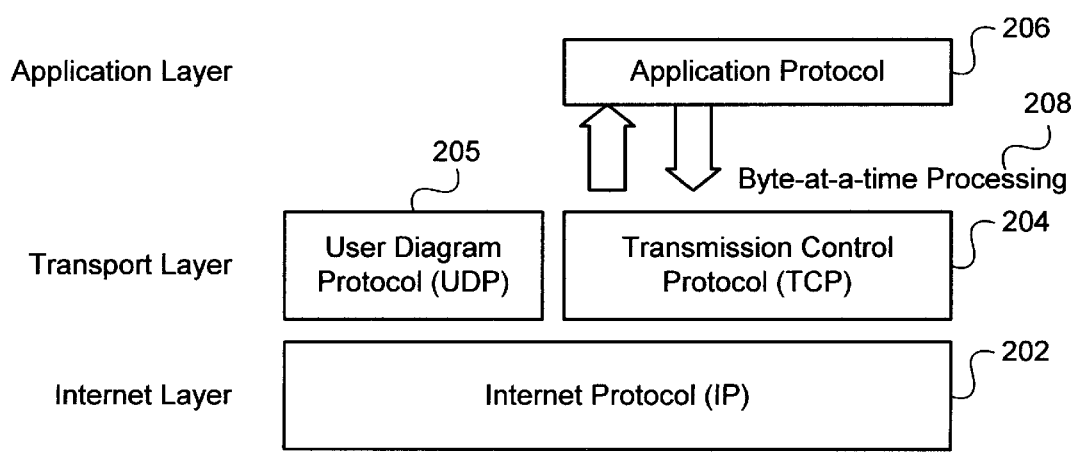
FIG. 2 is an illustration of the relation of the present invention to the application layer, transport layer, and Internet layer of a network.

FIG. 2 is an illustration of the relation of the present invention to the application layer, transport layer, and Internet layer of a network. In the preferred embodiment, the Internet layer includes the Internet Protocol (IP) 202, the transport layer includes both the UDP 205 and TCP 204 transport protocols. Other transport layer protocols can be used in addition to or in place of these protocols. In the preferred embodiment the application protocol 206 communicates with the TCP 204 using the byte-at-a-time processing technique of the present invention. In alternate embodiments, the present invention could be used between other protocols in the TCP/IP stack or other protocol stacks, e.g., the infrared data association (IrDA) protocol stack.

Figure 3:
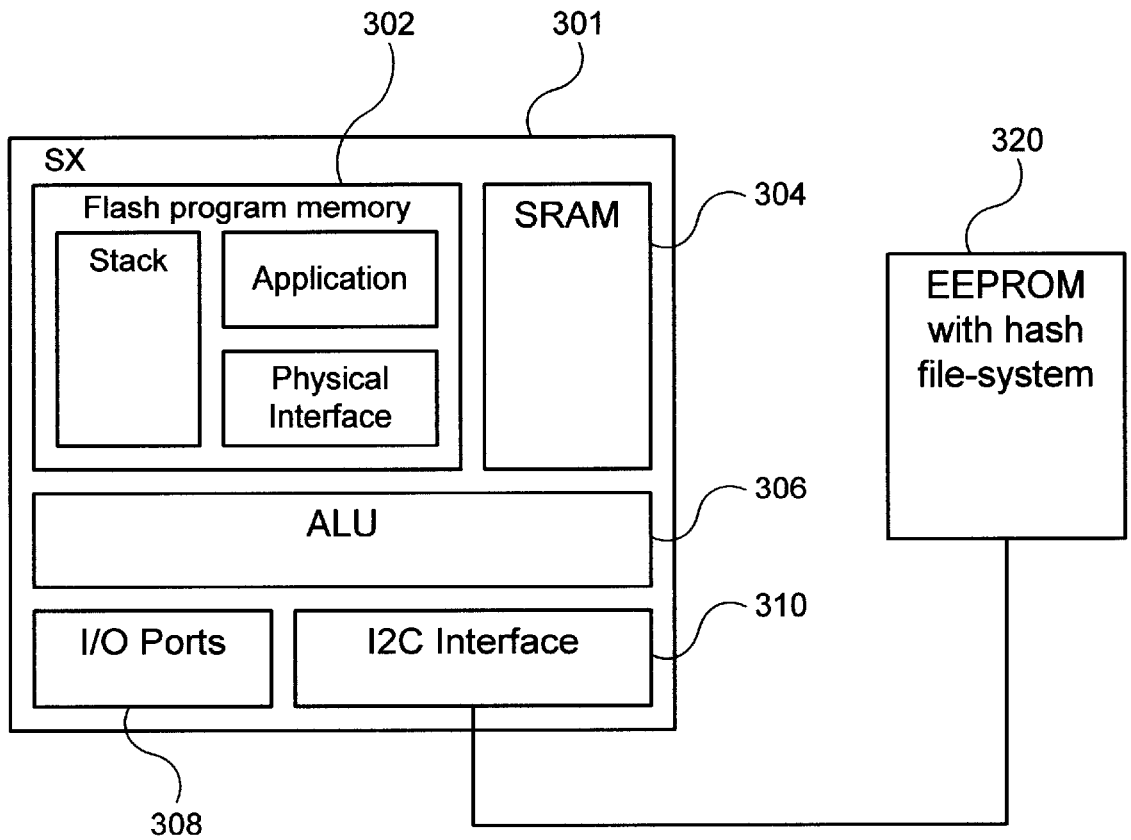
FIG. 3 is an illustration of microcontroller in which the present invention operates.

FIG. 3 is an illustration of microcontroller in which the present invention operates. FIG. 3 illustrates an SX microcontroller which in some embodiments of the present invention may be used as the client 104 and/or the server 102. It is envisioned that the present invention can be used with a variety of computers and is not limited to the SX series as described with reference to the preferred embodiment. The SX microcontroller 301 includes a flash program memory 302, a static random access memory (SRAM), an arithmetic logic unit (ALU) 306, input/output ports 308 and interfaces, e.g., an I2C Interface 310, which may communicate with external memory, e.g. an EEPROM 320. The flash memory includes the network stack, an application and a physical interface. In the preferred embodiment, the byte-at-a-time processing is performed using operations stored as an application in the flash program memory 302. The operation of the byte-at-a-time processing application is described below with respect to FIGS. 4 and 5. In the preferred embodiment, the off-chip EEPROM 320 is where the hash-file system is stored. A more detailed description of the operation of the hash file storage system is described below with reference to FIG. 6.

Figure 4:
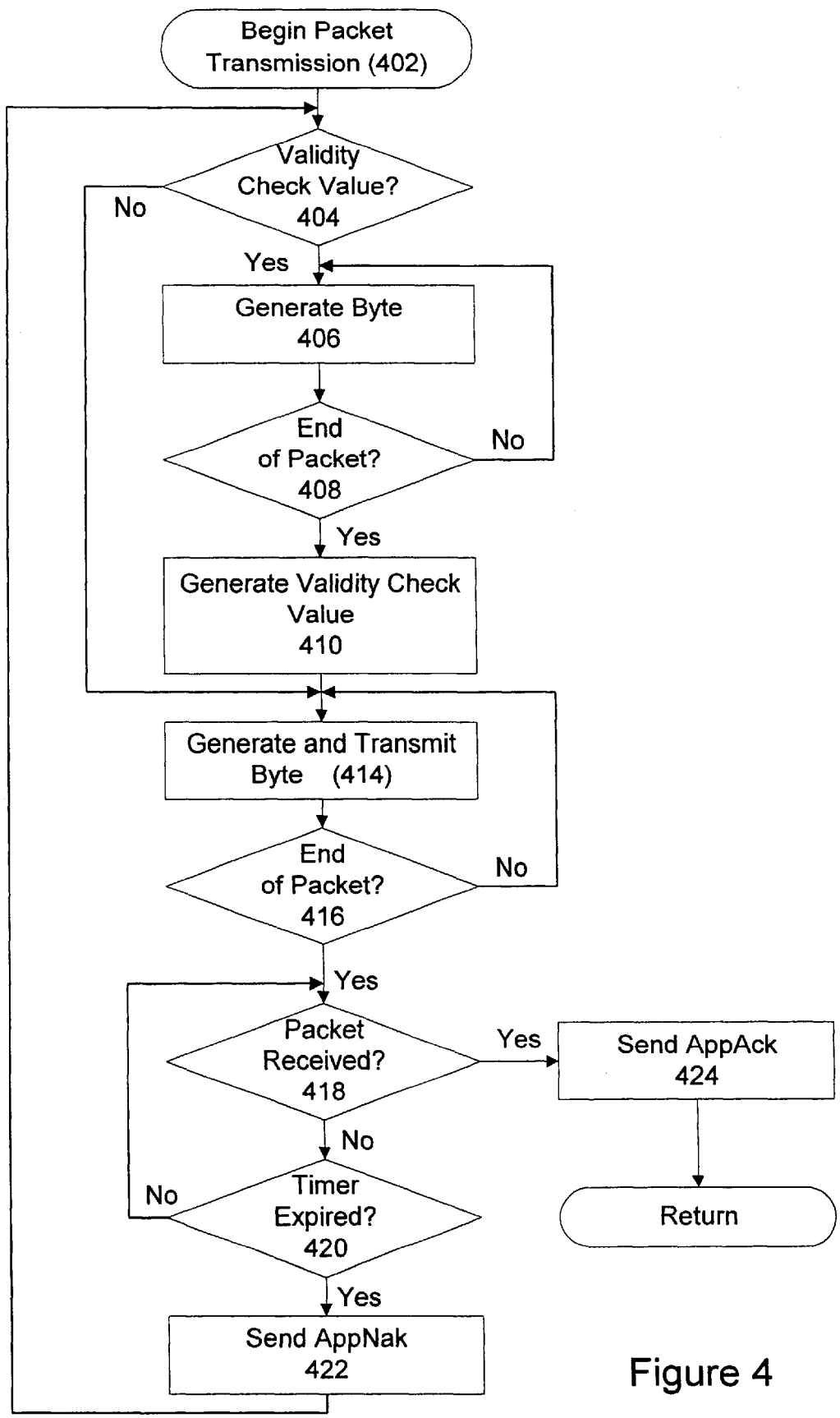
FIG. 4 is flowchart of the packet transmission processes according to the preferred embodiment of the present invention.

FIG. 4 is flowchart of the packet transmission processes according to the preferred embodiment of the present invention. As described above, on-chip RAM, e.g., SRAM 304, is expensive and adding an external RAM chip would increase the component count, along with increasing the size and cost of the device. Since the TCP/IP stack is only a tool to be used by the application running on the same microcontroller, it should use as little RAM as possible. One method of reducing the memory footprint of the network stack is to have a policy of not buffering any information at all. This requires that the packet be transmitted byte-by-byte as it is generated, and that a received packet be processed byte-by-byte as it is received.

If the network stack can meet this constraint, then it is up to the application to determine how to manage its own memory. The application can also adopt a byte-by-byte approach to conserve RAM. For the application this means that any transmitted information must be reproducible. If a remote host requests retransmission of a packet then the application must generate the data again since there will be no buffered copy to retransmit.

If the application cannot reproduce the data then it can buffer the data portion of each packet. There is still a savings here of at least 28 bytes per packet because only the data is being buffered. The 28 bytes represent the size of the non-data portion of each frame. In the preferred embodiment of the present invention, none of the data is buffered. In alternate embodiments, some data may be buffered, but the amount of data that is buffered is less than the data in a frame. For example, in an alternate embodiment, data is sent two-bytes-at a time as opposed to one-byte-at a time as in the preferred embodiment. In other embodiments, eight bytes or more may be sent at a time. In these alternate embodiments, buffering of the data is required, although the entire data frame need not be buffered.

As described above, most protocols require validity checks of the data to ensure proper transmission and receipt.

For example, the TCP/IP stack requires checksums and CRCs for data integrity at multiple levels in the stack. Some of these pose a problem for the byte-by-byte processing strategy of the preferred embodiment.

For example, PPP uses a 16-bit CRC which is computed over the entire packet and transmitted in the trailer. Since it is sent in the trailer there is no problem with computing the CRC as each byte is sent.

The Internet Protocol (IP) has a 16-bit checksum over the header which is transmitted in the header. Since it is computed from variables which are stored in RAM anyway there is no problem.

The UDP uses a 16-bit checksum over the UDP header and data which is transmitted in the UDP header. Fortunately the UDP specification (RFC768) allows for the checksum to be zero, in which case it is not checked by the recipient. However, ignoring the UDP checksum does not make the stack more susceptible to errors since all packets are protected by the PPP CRC.

The TCP has a 16-bit checksum, computed over the TCP header, a pseudo header and TCP data and transmitted in the TCP header. This is not optional and poses a problem for the byte-by-byte stack since earlier bytes depend upon bytes which haven't been processed yet.

Three potential solutions to this problem are: (1) transmit a dummy checksum in the TCP header and pad the TCP data with bytes to make the dummy checksum correct; (2) buffer the TCP data so the checksum can be computed; or (3) have the application produce the same stream of bytes twice, once to compute the checksum and the second time to transmit the data.

The first solution appears attractive, but when used with existing protocols like HTTP or SMTP there is no way to tell the application protocol when to ignore the extra bytes at the end of the payload.

The second solution is contrary to the byte-by-byte philosophy, and requires significant buffering of data.

The third solution is the solution implemented as part of the preferred embodiment of the present invention. The application still has the option to buffer the data itself, or, such as the case with HTTP, it can just transmit the same data twice.

In the preferred embodiment, an application program interface (API) can be used by applications that want to use TCP. The API is event driven, i.e., when the stack is able to send a packet it queries the application to see if there is any data to send. If the application is listening on a port, the TCP will inform the application as each byte is received. One example of such an API is set forth below in Table 1.

TABLE 1

| AppInit | Called to allow the application to initialize variables and do a passive open if the application is a server. |
| --- | --- |
| AppBytesToSend | Called by the TCP to see if the application has any data to transmit. The application should return with the number of bytes it wishes to send in the `w' register. |
| AppBytesAvailable | Called by the TCP when a packet is being received. `w' contains the number of bytes of data that will be received. This routine is a warning to the application that its AppRxData routine is about to be called `w' times. |

TABLE 1-continued

| AppTxData | Called once for each byte to be sent in a packet. The byte to be transmitted should be returned in `w' |
| --- | --- |
| AppRxData | Called once for each received byte. Until the complete packet has been received, the TCP cannot be sure whether the packet has been corrupted in transmit. Therefore the application should not make any irreversible changes based on the incoming data, until AppPacketOK is called. |
| AppAck | Indication to the application that the last packet transmitted has been acknowledged. This indicates that the packet will not need to be transmitted again. |
| AppNak | Indication to the application that the last packet has not been acknowledged. Subsequent calls to AppTxData should return the same packet data again because the packet will be transmitted again. |
| AppPacketOK | The last packet received was not corrupt. At this point the application can use the packet data. |
| AppPacketBad | The last packet received was corrupt. The application should expect to receive the packet again. |

Given the above description, an implementation of each API will be apparent to people skilled in the art.

With reference to FIG. 4, when the application prepares to transmit a byte of data, it determines 404 whether a validity check is necessary (this step could also be done after generating each byte of data). If no validity check value is necessary the byte can be generated and transmitted 414. If a validity check is to be performed, the application continually generates 406 a byte of data until all data in a packet is generated 408 (the number of bytes to be sent can be identified by using "AppBytesToSend" or the like). The application then generates 410 the validity check value, e.g., a checksum or CRC.

As described above, in the preferred embodiment of the present invention the packet data is not buffered, so in order to transmit the packet, the application will regenerate the byte. Each byte in the packet is generated and transmitted 414 sequentially (AppTxData). When all of the bytes of the packet have been transmitted 416 the transmitting device awaits an acknowledgment from the receiving device that indicates that the packet has been properly received. If the packet has been received 418, the application transmits 424 an application acknowledge signal "AppAck" indicating that this data will no longer need to be reproducible. The device can limit the amount of time it will wait for a packet receive acknowledgment by using a timer. When the timer expires 420 a not acknowledged signal "AppNak" is returned and the application begins again with step 404.

Figure 5:
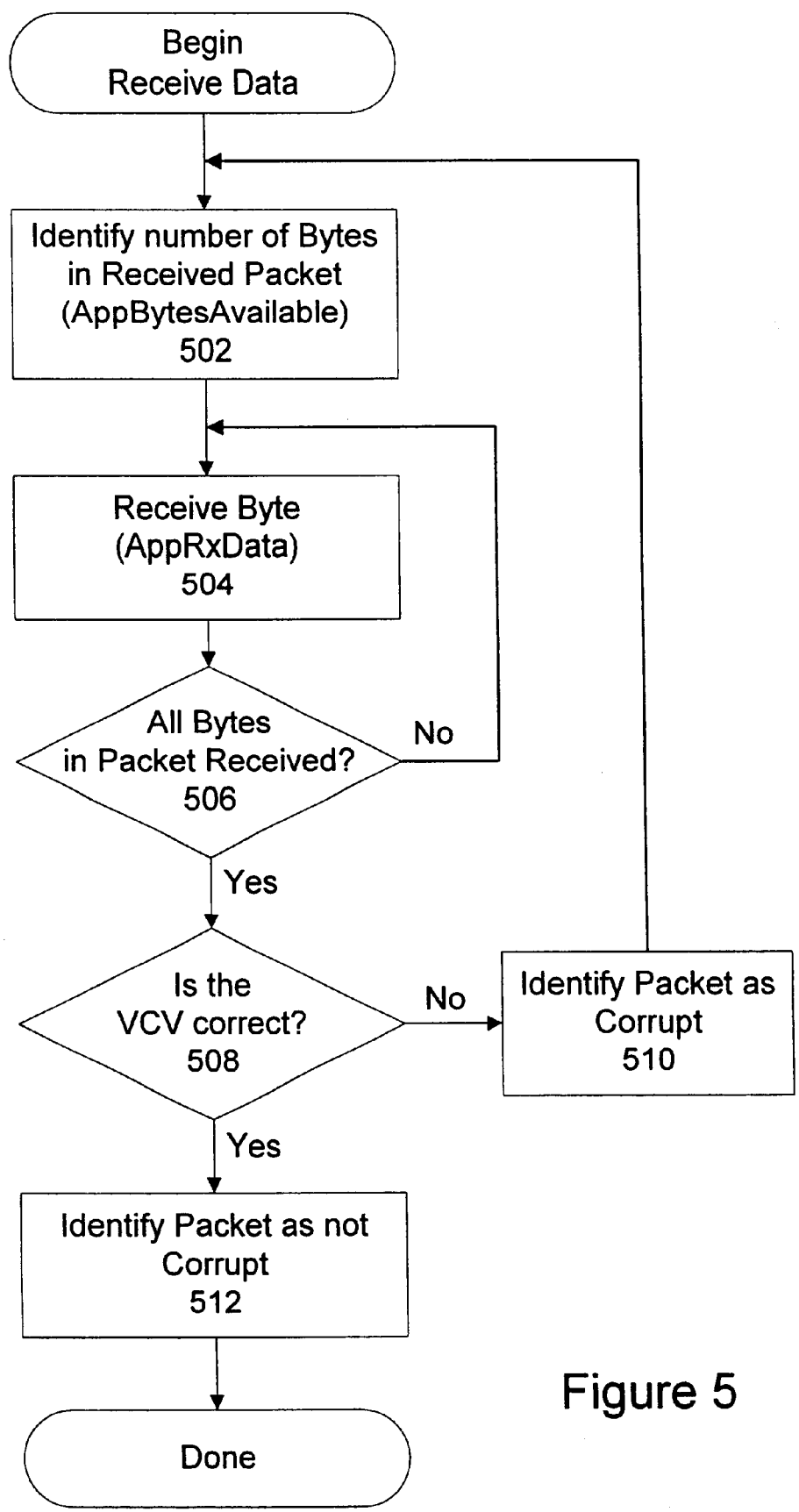
FIG. 5 is a flowchart of the packet receiving process according to the preferred embodiment of the present invention.

FIG. 5 is a flowchart of the packet receiving process according to the preferred embodiment of the present invention. When receiving a packet, the application identifies the number of bytes in the received packet (AppBytesAvailable). One technique for accomplishing this is used by the TCP/IP protocols which transmit the size of each packet in the packet header. An application in the client device 104 then receives 504 each byte (AppRxData) until all bytes in the packet are received 506. The client application then determines 508 whether the validity check value (VCV), e.g. a CRC, is correct. If the VCV is not correct the application identifies the packet as corrupt 510 (ApppacketBad) and a signal is optionally sent to the server 102 requesting that the packet be resent. The client application then awaits for the packet to be received again. If the VCV is correct 508 then the client application identifies 512 the packet as not corrupt and a packet acknowledgment is transmitted to the server which is received as described in step 418 if the server 102 is using the byte-at-a-time feature. It will be apparent that both the client 104 and server 104 do not need to be using the present invention. Instead, the present invention will operate successful even if only one of the client 104 and server 102 utilize the invention.

It will be apparent to those skilled in the art that modifications can be made to the above described preferred embodiments without departing from the scope of the present invention of transmitting information a unit at a time, where the unit can be a byte, multiple bytes, or a buffer, for example.

As described above, resources on a web-server are specified by a name in string form, known as a Uniform Resource Identifier (URI). Typical strings might be "/index.html", "/images/scenix. gif", or "/applets/com/scenix/demo/Bounce.class". A web-server should not make assumptions about the maximum length of a URI, since the maximum length is not defined and if it were, many URIs would not approach such a maximum. This poses a problem for memory limited devices since in order to accommodate URIs a large amount of memory would need to be reserved (and even then, the amount of memory to reserve is unknown since the maximum URI length is unknown). The present invention solves this problem by using a modified a hash table lookup at the server with an external memory storing the actual URIs.

Figure 6:
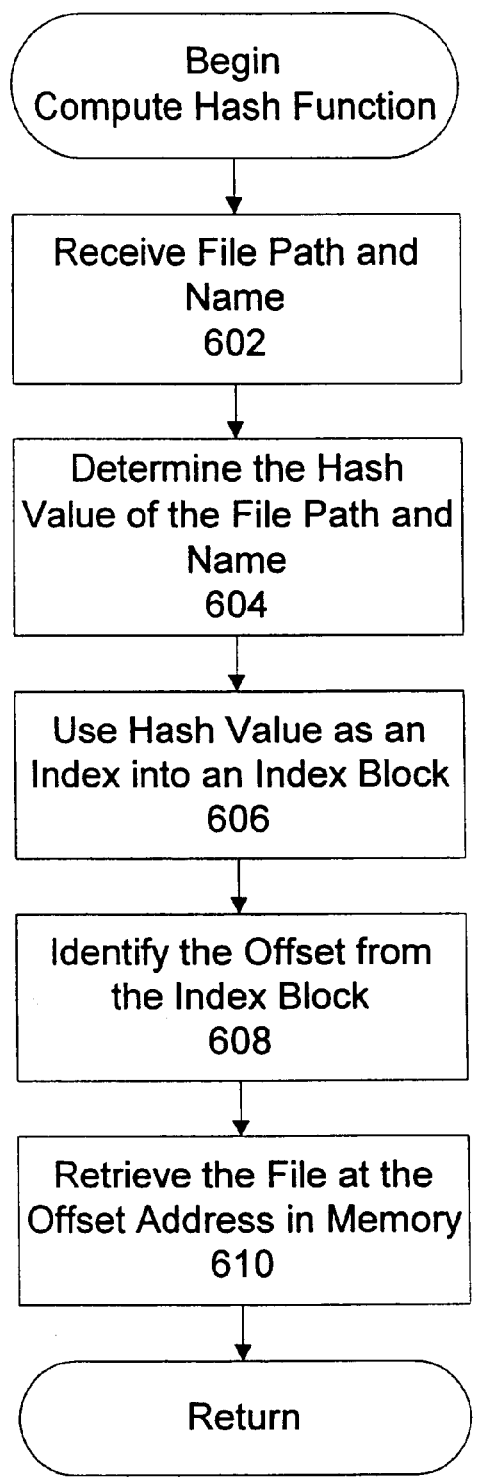
FIG. 6 is flowchart of the hashing processes according to the preferred embodiment of the present invention.
Figure 7:
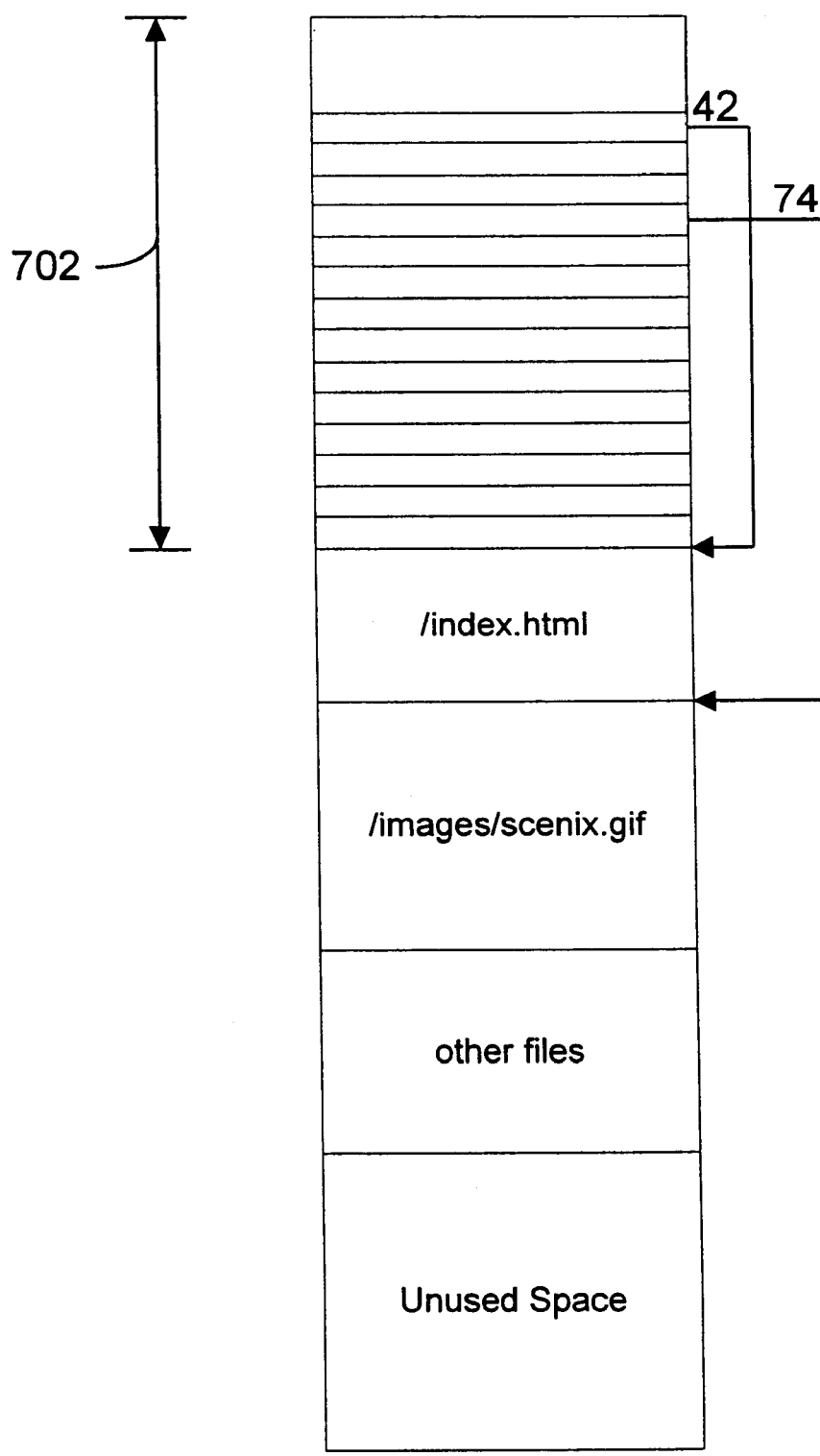
FIG. 7 is an illustration of a format of the external memory file system that is used in the hash table lookup aspect of the present invention.

FIG. 6 is flowchart of the hashing processes according to the preferred embodiment of the present invention and FIG. 7 is an illustration of a format of an external memory file system that is used in the hash table lookup aspect of the preferred embodiment of the present invention.

A hash function (for example., an unsigned 8-bit sum of the ASCII values of the characters in the URI) is computed over the URI of a "GET" request. The hash value is then multiplied by two and used as a lookup into a 512 byte table of 16-bit file offsets (called the index block 702). In one embodiment, hashing collisions are ignored. Some benefits of the present invention is that no string comparisons need to be performed (which are expensive and time consuming to perform) and no URIs need to stored on the server 102.

When the lookup table is created the user is capable of changing the URIs of any resources which have a hash collision, in some embodiments of the present invention. It is possible that a GET request might contain a URI which does not exist on the web-server but which hashes to the same value as a resource which does exist. In this situation the incorrect resource will be returned. However, since most GET requests are generated as the result of hyperlinks from other resources it is unlikely that an erroneous URI will be generated.

The web-server resources are stored in an external serial EEPROM 320. In the preferred embodiment this EEPROM 320 is 32 k bytes in size, but it could be up to 64 k bytes without any code changes.

The operation of the process is now described with reference to FIG. 6. A file path and name are received 602 by the application in the server 102. The application determines the hash value of the file path and name. Many different hash functions can be used. In the preferred embodiment, the hash function is an unsigned 8-bit sum of the ASCII numeric values of the characters in the URI. For example, if the file path and name is "/index.html" then the hash value is: (47+105+110+100+101+120+46+104+116+109+108)(Mod 256)=42. Similarly, the hash value of "/images/scenix.gif" is 74. These hash values are used as indicies into the index block 702. Then entry into the index block is the offset to the start of the actual file, as illustrated in FIG. 7.

After determining 604 the hash value for the file path and name the application in the server 102 uses 606 the hash value as an index into an index block in the external memory 320. The offset is read 608 from the index block. The server 102 then retrieves 610 the file at the offset address in the external memory 320.

In alternate embodiments, a verification system can be used to ensure that the file chosen using the hashing function is the correct file. For example, the beginning of each file could have another hash value corresponding to another hash function, e.g. a 16-bit hash. This will reduce the possibility of using an incorrect file due to collisions, for example. If a collision does occur then a collision resolution technique could be used, e.g. double hashing. A description of various collision resolution techniques is set forth in Knuth, The Art of Computer Programming, Vol. 3, (Addison-Wesley, 1998), which is incorporated by reference herein in its entirety. As described above, the external memory 320 can be any type of memory device and is not limited to EEPROM.

The following references pertain to various issues of the present invention and are all incorporated by reference herein in their entirety: (1) (RFC1661) W. Simpson (Ed), "The Point-to-Point Protocol", IETF Request for Comments, July 1994; (2) (RFC1662) W. Simpson (Ed), "PPP in HDLC-like Framing", IETF Request for Comments, July 1994; (3) (RFC1332) G. McGregor, "The PPP Internet Protocol Control Protocol (IPCP)", IETF Request for Comments, May 1992; (4) (RFC791) "Internet Protocol", IETF Request for Comments, September 1981; (5) (RFC792) "Internet Control Message Protocol", IETF Request for Comments, September 1981; (6) (RFC768) J. Postel, "User Datagram Protocol", IETF Request for Comments, August 1980; (7) (RFC793) J. Postel (Ed), "Transmission Control Protocol", IETF Request for Comments, September 1981; and (8) (RFC2068) R. Fielding et. al. "Hypertext Transfer Protocol—HTTP/1.1", IETF Request for Comments, January 1997.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A computer based method for accessing data files in an external memory without requiring a data file path name to be stored on internal memory, comprising the steps of:

receiving a data file path name;

determining a hash value of said data file path name;

indexing an index block in an external memory using an index address corresponding to said hash value;

identifying an offset value stored at said index address; and retrieving a file corresponding to said data file path name by accessing an offset address corresponding to said offset value.

2. The method of claim 1 further comprising the step of verifying the retrieved file by a collision resolution technique.

3. The method of claim 1 further comprising determining a second hash value based on said data file path name and comparing said second hash value to a value stored within said file corresponding to said data file path name.

4. The method of claim 1 wherein the external memory comprises an EEPROM.

5. The method of claim 1 wherein the internal memory comprises a static random access memory.

6. The method of claim 1 wherein determining the hash value of said data file path name produces a value within a predetermined range of hash values.

7. The method of claim 6 wherein the predetermined range of hash values corresponds directly to a single block of consecutive memory address locations in the external memory.

8. The method of claim 6 wherein the predetermined range of hash values corresponds to one or more blocks of memory address locations in the external memory.

9. The method of claim 1 wherein determining the hash value of said data file path name comprises calculating an unsigned 8-bit sum of the ASCII values of the characters in said data file path name.

10. The method of claim 1 wherein determining the hash value of said data file path name comprises calculating an unsigned 8-bit sum of the ASCII values of the characters in said data file path name and multiplying this sum by a multiplicative factor.

11. The method of claim 1 wherein the computer is a resource limited computer.

12. A computer based apparatus for accessing data files in an external memory without requiring a data file path name to be stored in internal memory, comprising:

receiving means for receiving a data file path name;

hashing means for determining a hash value of said data file path name;

indexing means for indexing an index block in an external memory using an index address corresponding to said hash value;

identifying means for identifying an offset value stored at said index address; and retrieving means for retrieving a file corresponding to said data file path name by accessing an offset address corresponding to said offset value.

13. The computer based apparatus of claim 12, further comprising verifying means for verifying the identity of the retrieved file.

14. The computer based apparatus of claim 12 wherein determining a hash value of said data file path name comprises calculating an unsigned 8-bit sum of the ASCII values of the characters in said data file path name.

15. The computer based apparatus of claim 12 wherein determining a hash value of said data file path name comprises calculating an unsigned 8-bit sum of the ASCII values of the characters in said data file path name and multiplying this sum by a multiplicative factor.

16. The computer based apparatus of claim 12 wherein the external memory comprises an EEPROM.

17. The computer based apparatus of claim 12 wherein the internal memory comprises a static random access memory.

18. The computer based apparatus of claim 12 wherein the computer is a resource limited computer.

* * * * *